May 9, 1961 L. H. GARDNER 2,983,285
SOLENOID OPERATED VALVE
Filed June 5, 1959 3 Sheets-Sheet 1
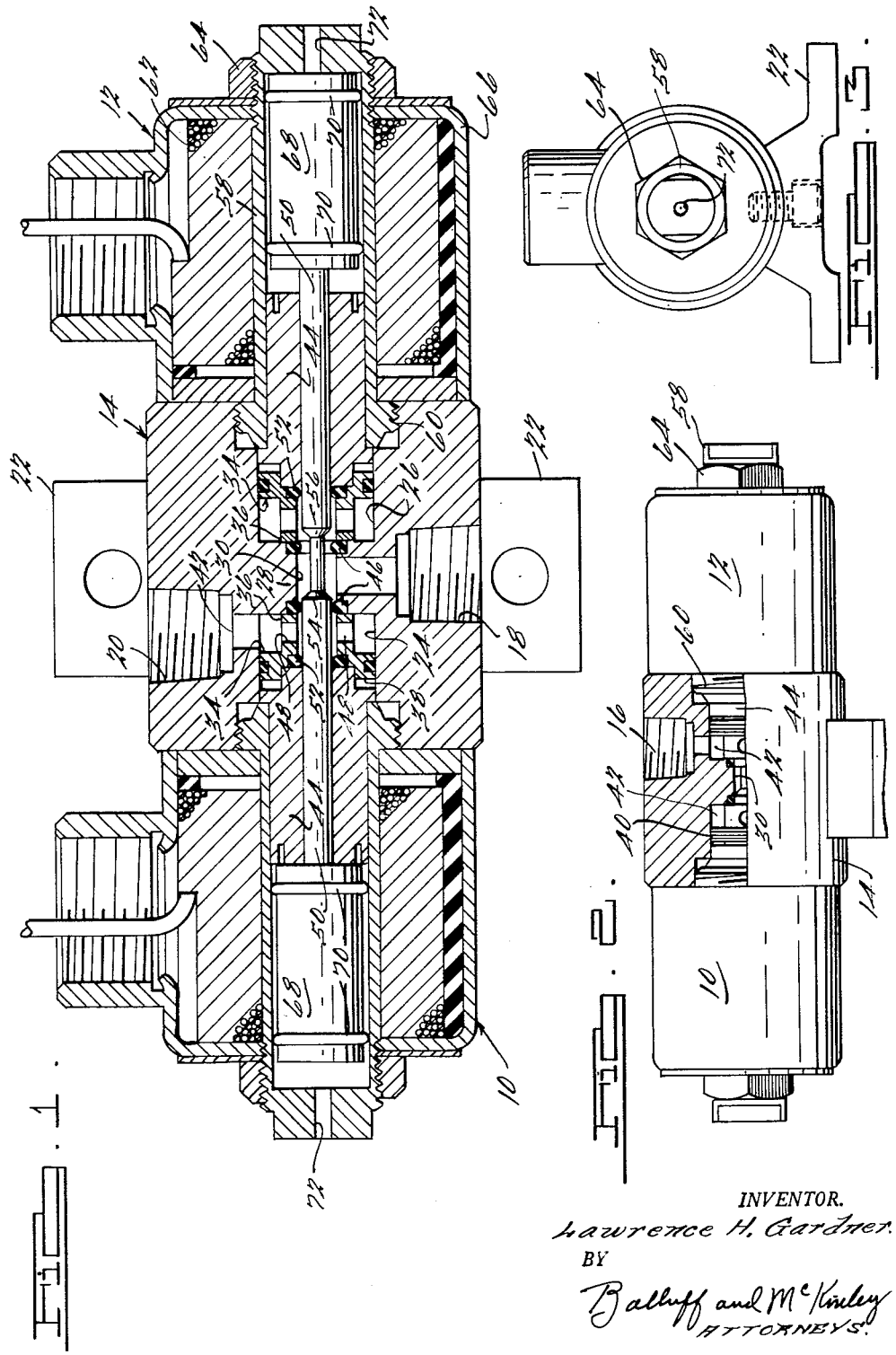
INVENTOR.
Lawrence H. Gardner.
BY
Balluff and McKinley
ATTORNEYS.

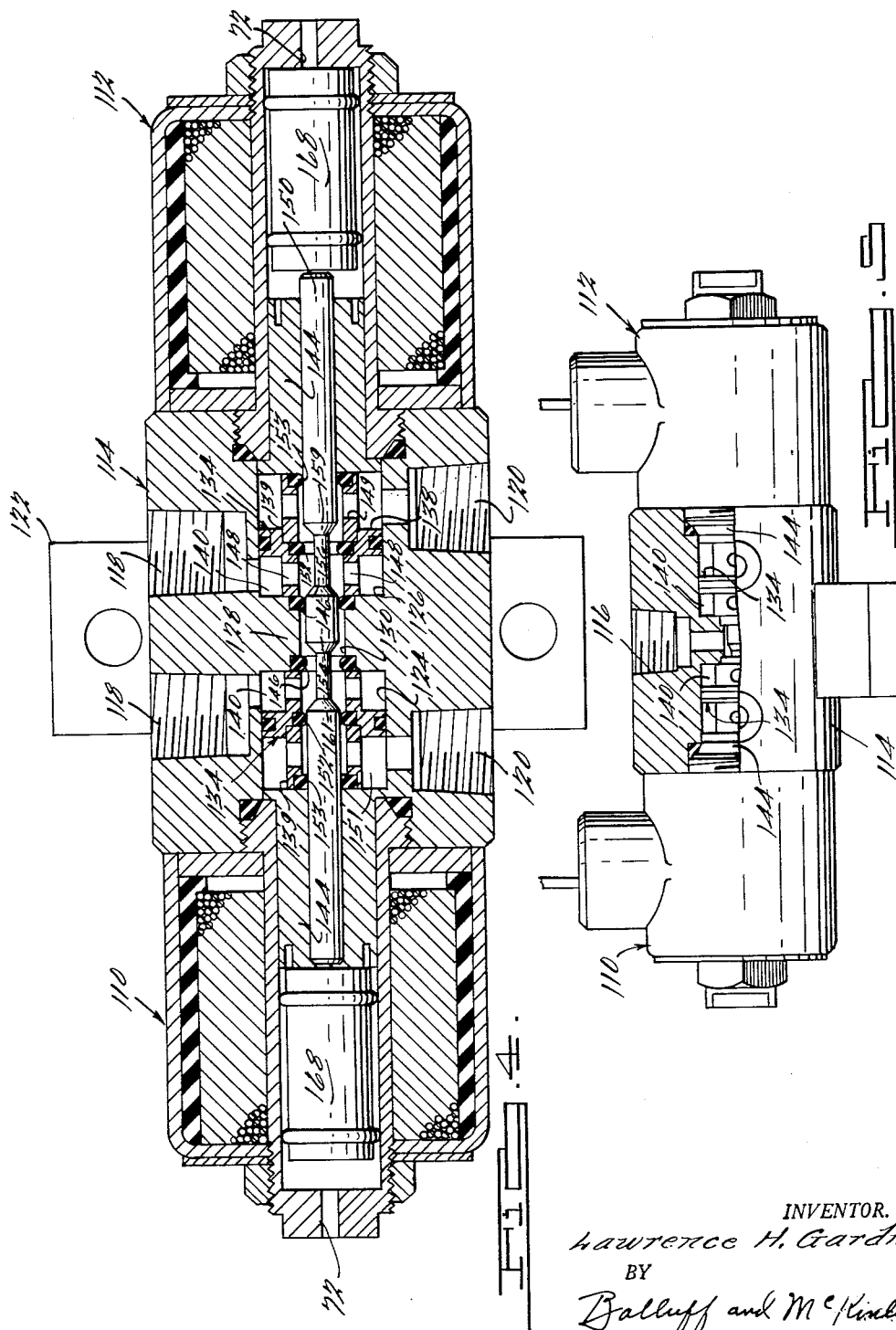

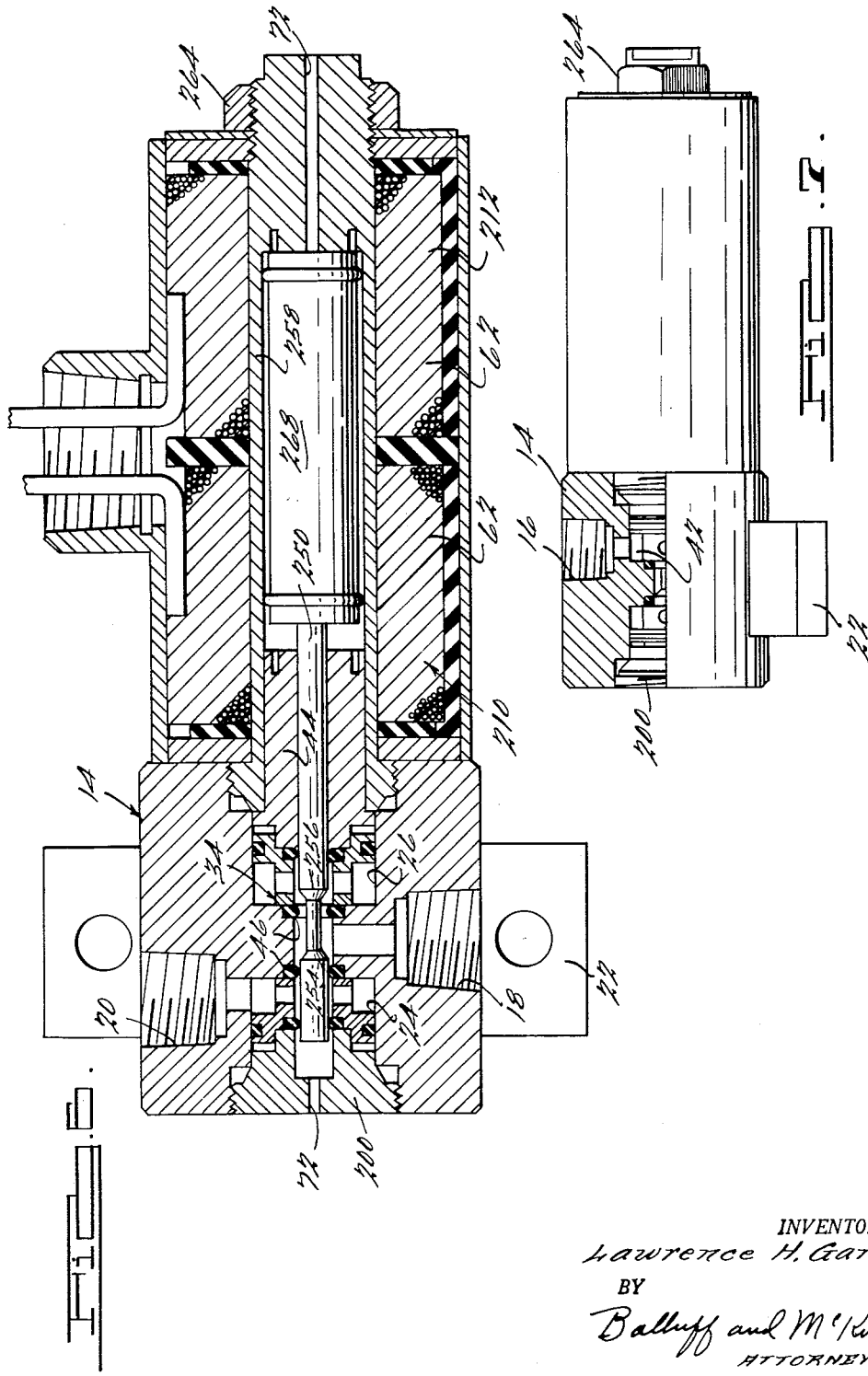

United States Patent Office 2,983,285
Patented May 9, 1961

2,983,285

SOLENOID OPERATED VALVE

Lawrence H. Gardner, North Olmsted, Ohio
(7313 Associate Ave., Cleveland 9, Ohio)

Filed June 5, 1959, Ser. No. 818,420

2 Claims. (Cl. 137—623)

This invention relates to valves.

In the conventional solenoid operated valve, the valve is either normally open or normally closed, so that the valve is inoperative in the event of current failure. Where such valves are used to control the carrying out of a process, current failure will not only interrupt the process but may also result in spoilage of the material in process.

The present invention overcomes this difficulty by utilizing oppositely acting solenoids which alternately move the valve between open and closed positions, and a valve construction which will remain in the position to which it is moved by the solenoid or manually by means of the provisions for manual operation of the valve incorporated therein.

A principal object of the invention, therefore, is to provide a new and improved valve construction, and more particularly one in which the valve is solenoid operated in both opening and closing directions and in which provisions are made for manual operation of the valve in the event of power failure.

Other and further objects of the invention will be apparent from the following description and claims and may be understood by reference to the accompanying drawings, of which there are three sheets, which by way of illustration show preferred embodiments of the invention and what I now consider to be the best mode of applying the principles thereof. Other embodiments of the invention may be used without departing from the scope of the present invention as set forth in the appended claims.

In the drawings:

Fig. 1 is a longitudinal sectional view of a valve embodying the invention;

Fig. 2 is a side elevational view of the valve on a reduced scale and partly in section, with the section taken 90° from that shown in Fig. 1;

Fig. 3 is an end elevational view of the valve;

Fig. 4 is a sectional view of a modified form of the invention;

Fig. 5 is a side elevational view of the valve shown in Fig. 4 on a reduced scale and partly in section, with the section taken 90° from that shown in Fig. 4;

Fig. 6 is a sectional view of a further modification; and

Fig. 7 is a side elevational view of the valve shown in Fig. 6 on a reduced scale and shown partly in section, with the section taken 90° from that shown in Fig. 6.

The valve shown in Figs. 1, 2 and 3 is a double solenoid three-way valve which includes in general opposed alternately acting solenoids 10 and 12 and a valve body 14 having a fluid pressure inlet port 16, a cylinder port 18, an exhaust port 20, and a mounting bracket 22. The valve body 14 is mounted between the solenoids 10 and 12 and is provided with a pair of oppositely disposed cylindrical valve chambers 24 and 26 separated by a common wall 28 having a passage 30 therethrough.

An annular valve member 34 is disposed in each of the chambers 24 and 26 and has an inner end 36 of smaller diameter than the diameter of the valve chambers 24 and 26 seated against the common wall 28 which forms the bottom wall of each of the chambers 24 and 26.

Each of the valve members 34 is provided with an annular flange 38 at its outer end carrying an O-ring 40 which sealingly engages the cylindrical wall of the chamber 24 or 26 so as to define an annular space 42 between each flange 38 and the common wall 28. A valve guide element 44 projects into each of the valve chambers 24 and 26 and has an inner end of smaller diameter than the diameter of said chambers seated in a recess in the outer end of the flange 38 of the valve member 34 for holding the latter against the wall 28.

An O-ring 46 is seated in an annular recess at each end of the passage 30 and provides a seal between the wall 28 and each of the valve members 34. Each of the O-rings 46 forms an annular valve seat. The inlet port 16 communicates with the annular space 42 in the valve chamber 26, while the exhaust port 20 communicates with the annular space 42 in the valve chamber 24, and the cylinder port 18 communicates with the passage 30 between the valve seats formed by the O-rings 46. Each of the valve members 34 is provided with a central passage therein in line with and communicating with and forming a continuation of the passage 30 in the common wall 28. In addition, the central passage in each of the valve members 34 communicates through lateral passages 48 with the annular space 42 therearound.

A valve stem 50 is axially shiftable in the guides 44 and extends through the passage 30, the continuations thereof in the valve members 34, and through the O-rings 46. An O-ring 52 around the valve stem 50 is disposed between each valve guide member 44 and the valve members 34 so as to form a seal therebetween. The valve stem is provided with a pair of spaced valves 54 and 56 which are spaced relative to the O-rings 46 so that one of such valves will seat on one of the O-rings as shown in Fig. 1, while the other valve 56 is unseated with respect to the other of the O-rings 46, and vice versa. It will be evident that with the valves arranged as illustrated in Fig. 1, the inlet port 16 is in communication with the cylinder port 18 through the annular space 42 in the valve chamber 26, the cross passages 48 which connect such annular space with the central passage of the valve member 34 in the valve chamber 26, through the open valve 46, 56, the passage 30, and the passage which connects the passage 30 with the cylinder port 18, and that at such time the communication between the exhaust port 20 and the cylinder port 18 is shut off.

Each of the valve guides 44 is secured within the end of a non-magnetic sleeve 58, one end 60 of which is threaded into a socket in the body 14 at the outer end of the valve chamber 24 or 26. The body 14 and each of the sleeves 58 form a support for the coil 62 of one of the solenoids 10 and 12, and a nut 64 threaded on the outer end of the sleeve 58 reacts against the casing 66 of the coil 62 for securing the same in operative relation with respect to its core 68. One core 68 is secured to each end of the stem 50. Each core 68 is slidable in a sleeve 58 and is provided with a pair of snap rings 70 which centrally locate the core 68 in the sleeve 58 so as to obtain a uniform air gap therebetween. The valve stem 50 is of such length and the valves 54 and 56 are so spaced thereon that when the coil of the solenoid 10 is energized the valve 54, 46 will be closed, the valve 56, 46 will be opened, and the core 68 of the solenoid 12 will be in its de-energized position, and the converse is also true. Thus, energization of the solenoid 12 will close the valve 56, 46 and open the valve 54, 46.

The solenoids 10 and 12 are alternately energized by any suitable means and so that each solenoid when it is energized is energized only momentarily. Thus, once the core of a solenoid is centered, it will remain in such position when the coil is de-energized until the coil of the opposite solenoid is energized. With this arrangement the valves 46, 54 and 46, 56 will remain in the position to which they are shifted by the solenoid 10 or 12, as the case may be.

The outer end of each of the sleeves 58 is provided with a tool aperture 72 whereby the end of a tool, such as a punch or screwdriver, may be applied to either of the cores 68 for shifting the valve stem 50 and the valves provided thereon from one position to another in the event of power failure. This makes it possible to manually operate the valves should power failure occur while a process is being carried out, without interrupting the continuity of the process. The areas of the valves 54 and 56 exposed to the air under pressure are the same so that the valves are balanced and the air pressure or pressure differential has no tendency to open or close either of the valves.

The valve shown in Figs. 4 and 5 is a double solenoid four-way valve which includes opposed solenoids 110 and 112, and a valve body 114 supported by a bracket 122. The body 114 is provided with an inlet port 116, a pair of cylinder ports 118, a pair of exhaust ports 120, and a pair of valve chambers 124 and 126 separated by a common wall 128 having a passage 130 therethrough between the chambers 124 and 126.

An annular valve member 134 identical with the member 34 is disposed in each of said chambers 124 and 126 with the small inner end of the member 134 seated against the wall 128 and with the flange 138 in sealing engagement with the cylindrical wall of the chamber 124 or 126, as the case may be, and so as to define annular spaces 140 around each of the valve members 134 between the flange 138 thereof and the wall 128. A spacer 139 seated in a recess in each of the flanges 138 is secured in position by the valve guide member 144 like the valve guide member 44. The members 134 and 139 are provided with central passages at each end of and in line with the passage 130. The central passages in the valve members 134 communicate through lateral passages 148 with the annular spaces 140 with which the cylinder ports communicate. The central passages in the members 139 communicate through the cross passages 149 with annular spaces 151 around the members 139 with which the exhaust ports 120 communicate, while the inlet port 116 communicates directly with the passage 130.

O-rings 146 form spaced valve seats around each end of the passage 130 and a seal between the wall 128 and each of the valve members 134. O-rings 152 surrounding the central passages in the members 134 and 139 form spaced valve seats around such passages, while O-rings 153 disposed between each of the members 139 and the adjacent guide 144 form a seal around the valve stem 150 which extends through the center passage 130 and the continuations thereof in line therewith in the members 134 and 139. The ends of the stem 150 extend through the guides 144 so that the stem 150 may be shifted to the left by the core 168 of the solenoid 112 and shifted to the right by the core 168 of the solenoid 110. In this case the valve member 150 is provided with spaced valves 154, 156, 159 and 161, the valve 159 cooperating with one of the O-rings 152 to form a valve between the annular passages in the members 134 and 139. The valve 156 cooperates with one of the O-rings 146 to form a valve between the center passage 130 in the wall 128 and the center passage in the valve member 134 to the right thereof; the valve 154 cooperates with the other O-ring 146 to form a valve between the other end of the passage 130 and the continuation thereof within the valve member 134 on the left-hand side; and the valve 161 cooperates with the O-ring 152 to form a valve between the center passages in the members 139 and 134 on the left-hand side of the valve.

In the position shown, the valve 146, 154 and the valve 152, 159 are open, while the others are closed, thereby porting high pressure fluid from the inlet port 116 to the left-hand cylinder port 118, and porting the right-hand cylinder port 118 to the right-hand exhaust port 120. Energization of the coil of the solenoid 112 will cause the core 168 thereof to shift the valve stem 150 so as to close the valves shown open in Fig. 4 and to open the valves shown closed in Fig. 4, thereby porting the left-hand cylinder port 118 to exhaust and the right-hand cylinder port 118 to the inlet port 116.

Except in the particulars noted, the construction and operation of the valves shown in Figs. 4 and 5 are the same as those shown in Figs. 1, 2 and 3, and all of the parts are the same except that the valve body 114 of Fig. 4 includes two additional ports, the valve chambers 124 and 126 are deeper or longer, the valve stem 150 is provided with four valves instead of two, and additional members 139 are provided, as well as two additional O-rings to provide the additional valve seats required for the four-way valve illustrated.

The valve shown in Figs. 6 and 7 is a double solenoid three-way valve like that shown in Figs. 1, 2 and 3, except in this case the opposed solenoids 210 and 212 are both mounted on one side of the valve body 14. The valve body 14 and the parts associated therewith, as illustrated in Figs. 6 and 7, are the same as those of Figs. 1, 2 and 3, with the exception that a plug 200 is threaded into the threaded end of the valve chamber 24 for closing the same in lieu of the threaded sleeve 58 shown in Fig. 1. In this case the coils 62 of the solenoids 210 and 212 are mounted side by side around an elongated tube 258 which is like the tube 58 except for being longer, and a nut 264 carried on the threaded outer end of the tube 258 secures the coils of the solenoids 210 and 212 in operative position on the sleeve 258.

The valve stem 250 of Figs. 6 and 7 has the same valves 254 and 256 as 54 and 56 in Fig. 1 and is connected to a double core 268 which is shiftable axially within the sleeve 258. Energization of the coil of the solenoid 210 will shift the double core to the left, whereas energization of the coil of the solenoid 212 will shift the core 268 to the right, thereby shifting the valve stem 250 so as to close or open the valve 254, 46 and the valve 256, 46, as the case may be.

In the modifications shown in Figs. 4, 5, 6 and 7, as in Fig. 1, openings 72 in the ends of the valve permit manual shifting of the valves in the event of power failure.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A valve assembly for controlling the supply and exhaust of air to and from a work cylinder comprising a valve body having a pair of oppositely disposed cylindrical valve chambers therein separated by a common wall having a passage therethrough between said chambers, an annular valve member in each chamber having an inner end of smaller diameter than the diameter of said valve chamber seated against said common wall, said valve member having an annular flange at its other end sealingly engaging the cylindrical wall of said chamber to define an annular space between said flange and said common end wall, a valve guide element in each chamber and having an inner end of smaller diameter than the diameter of said chamber seated against the outer end of said valve member for clamping said valve member against said common wall, an O-ring forming a valve seat around each end of said passage, said passage and said annular spaces each having a port communicating therewith, each annular valve member having a radial opening therein communicating with the annular space therearound and an axial passage in line and communicating with said passage in said common wall and with said radial opening, an axially shiftable valve stem slidably supported by said valve guide elements and extending through said passages and O-rings, said valve stem having a pair of spaced valves thereon spaced relative to said O-rings so that one of said valves will seat on one of said O-rings while the other valve is unseated with respect to the other of said O-rings and vice versa, and a pair of alternately acting oppositely disposed solenoids each having a core operably connected to said valve stem and disposed so as to react on said valve stem in opposite directions for alternately shifting the same back and forth for alternately seating the valves thereon on their respective O-rings.

2. A valve assembly according to claim 1 provided with openings at its opposite ends in line with said valve stem whereby oppositely directed manual forces may be applied to said valve stem for shifting the valves thereon to their open and closed positions.

References Cited in the file of this patent

UNITED STATES PATENTS

| | | |
|---|---|---|
| 2,407,184 | Sparrow | Sept. 3, 1946 |
| 2,591,800 | Gardiner | Apr. 8, 1952 |
| 2,641,279 | Baldwin | June 9, 1953 |
| 2,765,808 | Tydeman | Oct. 9, 1956 |
| 2,880,755 | Brown | Apr. 7, 1959 |

FOREIGN PATENTS

| | | |
|---|---|---|
| 1,176,707 | France | Apr. 15, 1959 |